United States Patent Office 3,285,904
Patented Nov. 15, 1966

3,285,904
COPPER-CONTAINING POLYAZO DYE
Otto Senn, Basel, Switzerland, assignor to Sandoz Ltd. (also known as Sandoz A.G.), Basel, Switzerland
No Drawing. Filed Sept. 24, 1964, Ser. No. 399,090
Claims priority, application Switzerland, Apr. 29, 1960, 4,964/60
1 Claim. (Cl. 260—145)

This invention is a continuation-in-part application to copending application Ser. No. 101,375, filed on April 7, 1961, and now abandoned, and it relates to a new and valuable copper-containing polyazo dye.

The new dye of the present invention is produced by coupling in any desired order (a) one mole of the diazo compound of an aminoazo dye, formed by coupling a diazomonoazo or diazodisazo compound containing in ortho-position to the diazo group a substituent permitting the formation of copper complex compounds, with 1-amino-8-hydroxynaphthalene-3,6-disulfonic acid in the 7-position thereof, and (b) one mole of a diazo or diazomonoazo compound, which contains in ortho-position to the diazo group a substituent permitting the formation of copper complex compounds with one mole of 1,3-dihydroxy-4-chlorobenzene, and treating the resulting polyazo dye which contains three sulfonic acid groups, in substance with a copper-yielding agent.

Alternatively, the diazo compound (a) or the diazo compound (b) can be coupled first with 1,3-dihydroxy-4-chlorobenzene, the intermediate thus formed treated with a copper-yielding agent, and the copper complex compound coupled with the diazo compound (b) or the diazo compound (a) to give the polyazo dye which is finally treated in substance with a copper-yielding agent. The new dye has the formula

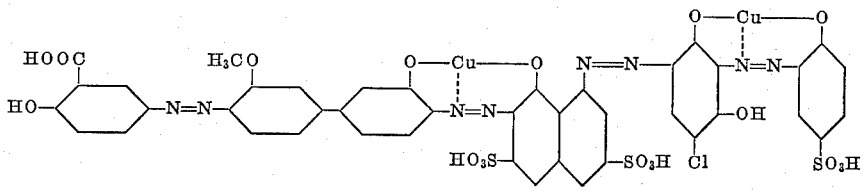

The preferred mode of production consists in coupling the disazo dye prepared from tetrazotized 4,4'-diamino-3.3'-dimethoxy-2-carboxylic acid and 1-amino-8-hydroxy-3.6-disulfonic acid with 1,3-dihydroxy-4-chlorobenzene to give a trisazo dye which is coupled with the diazo compound of 1-methoxy-2-aminobenzene-4-sulfonic acid to give the tetrakisazo dye, this being finally treated in substance with a copper-yielding agent.

The coupling of the diazomonoazo and diazodisazo compound in the 7-position of the 1-amino-8-hydroxy-naphthalene-3,6-disulfonic acid is generally performed in weakly alkaline solution. The diazotization of the intermediate compound to the diazo compound (a) is generally carried out by the indirect method.

The first coupling on the 1,3-dihydroxy-4-chlorobenzene can take place in (acetic) acid (neutral or weakly alkaline solution, while the second coupling generally requires, in addition to the presence of an alkaline agent such as ammonia or sodium carbonate the addition of a diazo stabilizer such as naphthalene-2-sulfonic acid and in certain cases an agent for promoting the coupling reaction, for example pyridine.

The copper complex compound can be prepared in the conventional manner, most advantageously by heating an aqueous paste or solution of the dye containing a copper-yielding agent and an alkaline salt of a low-molecular aliphatic carboxylic acid.

In the example the parts and percentages are by weight and the temperatures in degrees centigrade.

Example

The disazo dyestuff, prepared in per se conventional manner from 24.4 parts of tetrazotized 4,4'-diamino-3.3'-dimethoxy-1,1'-diphenyl, 13.8 parts of 1-hydroxybenzene-2-carboxylic acid and 31.9 parts of 1-amino-8-hydroxynaphthalene-3,6-disulfonic acid, is dissolved in 2000 parts of water after which 6.9 parts of sodium nitrite are added, and diazotization carried out by the addition of 30 parts of 30% hydrochloric acid at 10°. The resultant diazo compound is then coupled with 14.4 parts of 1,3-dihydroxy-4-chlorobenzene in the presence of 200 parts of sodium carbonate at 0°. The so-produced green trisazo dyestuff is precipitated with sodium chloride, then dissolved in 2000 parts of water with the addition of 23 parts of naphthalene-2-sulfonic acid and 50 parts of ammonia, and coupled at 0° with the diazo compound of 20.3 parts of 1-methoxy-2-aminobenzene-4-sulfonic acid. The so-obtained olive-dyed tetrakisazo dyestuff is filtered off and is purified by reprecipitation from hot water.

For conversion of the said tetrakisazo dyestuff into the copper complex compound, the former is dissolved in 3000 parts of water, after which 100 parts of sodium acetate and 50 parts of crystalline copper sulfate are added to the solution which is then heated in an enameled pressure vessel for 4 to 6 hours at 110–120°, until the color has changed to a dark brown. The dyestuff is then salted out with sodium chloride, filtered and dried.

The dye has the formula

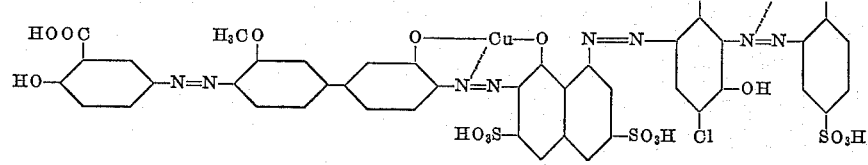

and is obtained as a dark powder which dissolves in water with a dark brown and in concentrated sulfuric acid with a violet-brown coloration. It dyes cotton, viscose filament and staple fiber and other regenerated cellulosic fibers in dark brown shades. The dyeings on these fibers have excellent perspiration fastness, especially when a crease-resistant resin finish is applied, and good fastness to light, washing, water, sea water and milling. The dyeings do not undergo a change of shade when submitted to these wet treatments or exposed to light.

An unexpected property shown by the dye is its stability in aqueous solution over a period of several days, an important point in dyeing where stock solutions are often prepared in advance for use as required.

The dye can be applied to the cotton or viscose rayon component of blends with triacetate fiber; it reserves the triacetate component white. It can be shown that the same excellent triacetate reserve is obtained when an aqueous stock solution of the dye is applied after several days' storage, which is surprising since this is not the case with similar other known dyes containing 1,3-dihydroxybenzene as coupling component. These latter dyes stain the triacetate component of blends with cellulosic fibers and thus are unsuitable for dyeing these materials.

*Dyeing example*

100 parts of cotton are entered at room temperature (about 20–30°) into a solution of 0.6 part of the dyestuff prepared according to the example and 2 parts of trisodium phosphate (or sodium metaphosphate or trisodium polyphosphate) in 3000 parts of water, with the addition of 10 parts of Glauber's salt. The dyebath is heated to boiling temperature in the course of 30 minutes. During such heating, an additional 10 parts of Glauber's salt are added. Dyeing of the cotton is carried out at boiling temperature for 15 minutes. At the end of this time, 20 more parts of Glauber's salt are added; after which the dyeing is completed in the course of 15–20 minutes in the cooling bath. The cotton is withdrawn from the bath, is thoroughly rinsed and dried. It is dyed in a black-brown shade.

The fastness properties of the dyeing can be further enhanced by a treatment with a copper-containing polyalkylene-polyamine. To this end, 100 parts of dyed and dried cotton are introduced at 30° into a bath consisting of 3000 parts of water and 2 parts of a copper-containing polyalkylene-polyamide. The bath is heated to 70° and the dyed cotton is kept therein for 30 minutes. Thereupon the dyed and treated cotton is rinsed and dried. Its shade remains unchanged.

Cotton-triacetate and viscose rayon-triacetate blend fabrics can be dyed on similar lines with a white reserve of the triacetate component.

Having thus disclosed the invention what I claim is:

The copper complex compound of the polyazo dye corresponding to the formula

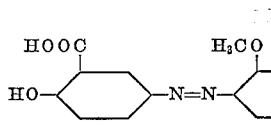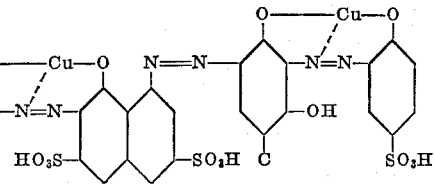

References Cited by the Examiner

UNITED STATES PATENTS 2,870,135   1/1959   Senn _____ 260—145

OTHER REFERENCES

Colour Index, vol. 3, 2nd ed., page 3598 (1956).

CHARLES B. PARKER, *Primary Examiner.*

FLOYD D. HIGEL, *Assistant Examiner.*